No. 651,566. Patented June 12, 1900.
W. A. FREISE.
WATERWORKS WITH FILTERING SYSTEM.
(Application filed Apr. 20, 1899.)
(No Model.)
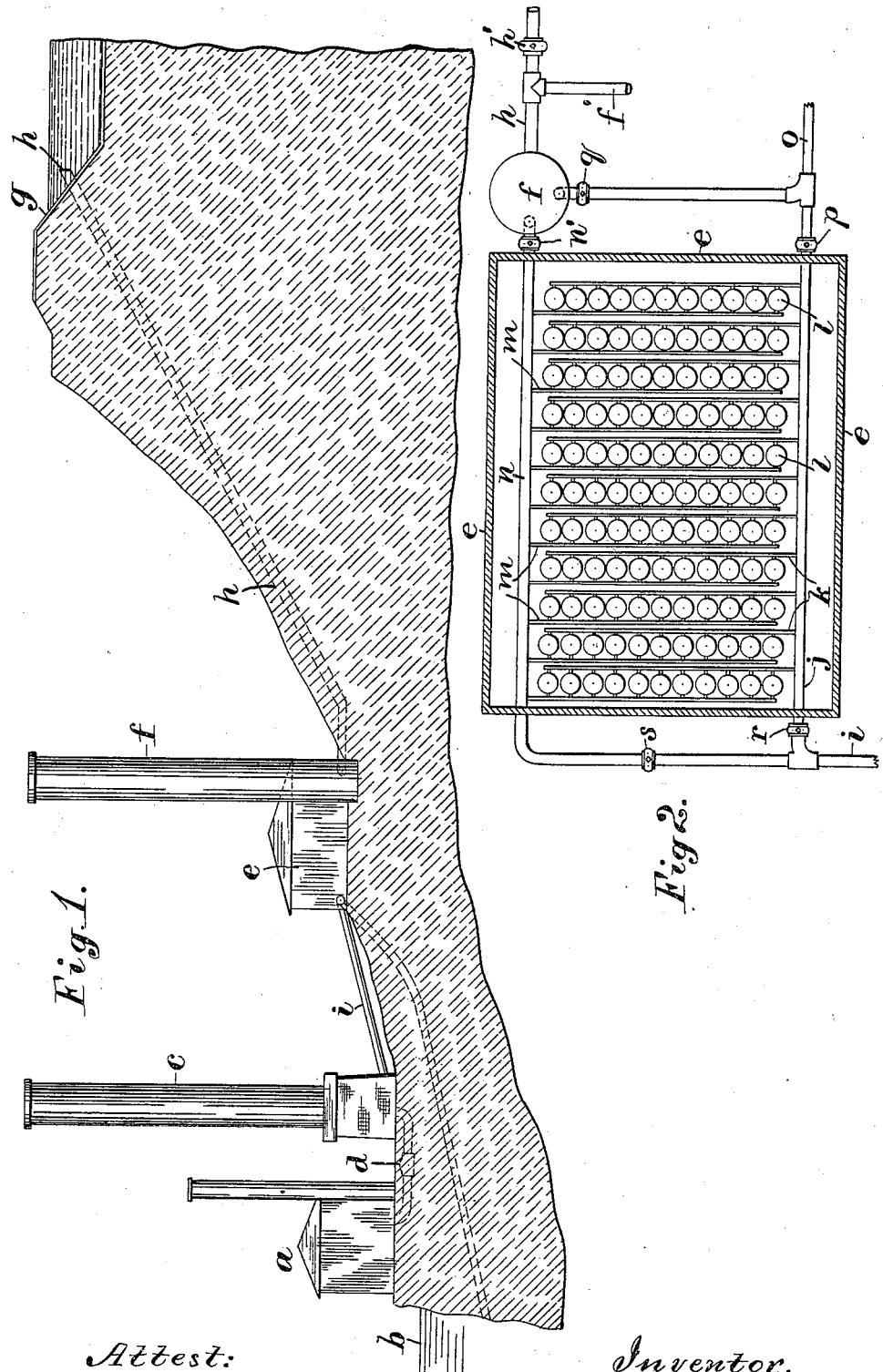
Attest:
L. Lee.
A. H. Perkins
Inventor.
William A. Freise, per
Thomas S. Crane, Atty.

UNITED STATES PATENT OFFICE.

WILLIAM A. FREISE, OF NEWARK, NEW JERSEY.

WATERWORKS WITH FILTERING SYSTEM.

SPECIFICATION forming part of Letters Patent No. 651,566, dated June 12, 1900.

Application filed April 20, 1899. Serial No. 713,730. (No model.)

*To all whom it may concern:*

Be it known that I, WILLIAM A. FREISE, a citizen of the United States, residing at Newark, Essex county, New Jersey, have invented certain new and useful Improvements in Waterworks with Filtering Systems, fully described and represented in the following specification and the accompanying drawings, forming a part of the same.

The object of the present invention is to furnish a means of supplying cities and towns with filtered water; and the invention comprises the combination of a battery of pressure filters, a pump adapted to force water through the filters, and a receptacle, as a tower or reservoir, to receive a water-reserve, which performs two important functions. First, such reserve serves to furnish filtered water for washing the filters, by which means they may be cleansed with much greater rapidity and left in readiness for immediate use at the close of the washing operation, and, second, the reserve serves to supply the distributing-mains while the filters are being washed, so as to avoid the expense of duplicating the filtering-plant, which would be necessary if it were required to continue the filtration without any interruption for cleansing purposes.

The invention will be understood by reference to the annexed drawings, in which—

Figure 1 is a diagram illustrating a pumping and filtering plant connected with a reservoir upon the top of a hill. Fig. 2 is a plan of the filtering-plant.

$a$ designates a pumping-station upon the bank of a river, lake, or other water-supply $b$.

$c$ designates a water-tower adjacent to the pumping-station and receiving water therefrom by a pipe having a check-valve $d$. Such water-tower would be required only in case single-acting pumps were used, like the Cornish-engine pumps, which are still employed in many pumping-stations. Where double-acting pumps or duplex pumps are employed, the water-tower would not be required.

$e$ designates the filtering plant or station, and $f$ a water-column connected therewith and connected also with the reservoir $g$ by pipe $h$.

A pipe $i$ delivers the water from the pumping-station $a$ or water-tower $c$ to the inlet of the filters, and the outlet of the filters is connected with the column $f$, which, if the reservoir $g$ be employed, would be the same height as the reservoir and would serve to furnish a reserve of water for cleansing the filters when the water in the reservoir was low. The system may obviously be constructed with either the water-column $f$ or the reservoir $g$ alone, the reservoir being used where the storage of a large quantity of water is permissible, and the water-column being positively required where there is no elevated ground and the Holly system of continuous pumping into the mains is employed.

In Fig. 2, where $e$ is applied to the walls of the filtering-plant building, eleven rows of filters $l$ are represented, which have their inlets connected to the pipe $i$ by a main branch $j$ and subordinate branches $k$. The outlets of the filters are connected by subordinate branches $m$ to a delivery-pipe $n$, which discharges normally to the water-column $f$ through a cock $n'$. A cock $h'$ is shown in the pipe $h$, which would connect the water-tower with the reservoir, if one were used, and a branch of the pipe $h$ furnishes the water-column with a connection to the distributing-mains $f'$.

The pipe $j$ is connected with a sewer $o$ by cock $p$, and the sewer is also connected with the water-tower by a pipe and cock $q$, which serve to drain the tower to the sewer whenever required. The supply-pipe $i$ is connected with the pipe $j$ by cock $r$, and it is also (for use in case of accidents) connected with the pipe $n$ by cock $s$.

In the normal operation of the filtering plant the cocks $p$, $q$, and $s$ are closed and the cocks $r$ and $n'$ are opened, and the water then flows from the pipe $j$, through all of the filters, into the delivery-pipe $n$, which discharges the filtered water to the water-column $f$. If a reservoir be employed, the cock $h'$ would also be normally open and the water would stand at the same level in the reservoir and the water-column. If no reservoir were employed, the water would be maintained at a suitable height in the water-column by regulating the pumping apparatus, and in either case the distributing-mains $f'$ would be supplied with filtered water. When the filters require washing, the cock $r$ is closed and the supplying of water through the pipe $i$ is arrested. The cock $p$ is then opened, connecting the pipe $j$ with the sewer, which reverses the relation of the filters to the water-pressure and permits the water in the column $f$ to force a current backwardly in a reverse direction through the filters, so that the pipes $m$ supply filtered water to the filter-beds and the pipes $k$ discharge the washing-water and impurities therefrom to the sewer-pipe $o$. When the filter-beds are freed from the impurities by filtered water, they are left in condition for immediate use, and the filtration can be promptly recommenced by closing the cock $p$, reopening the cock $r$, and renewing the supply of water to be filtered through the pipe $i$.

It will be observed that the connections of the water-column $f$ to the distributing-main $f'$ (and to the reservoir, if one be used) is wholly unaffected by the manipulation of the cocks $p$ and $r$, and the reserve of water in the column $f$ thus supplies the mains with filtered water during the washing of the filters, which with pure water requires much less time than with impure water.

Where impure water is used for washing a filter, the impurities of the filter-bed are less perfectly removed and the impure water remains in the bed and all the passages of the filter at the close of the washing operation. When the filtering operation is renewed at the close of such a washing operation, the impure water in the filter-bed and passages mingles with the product of the filtering process for a considerable length of time and contaminates the filtered water both in respect to quality and appearance, while such impurities are gradually eliminated. If pure water is desired, it is therefore necessary when washing with impure water to throw away the product when the filtration is recommenced for a considerable length of time, and even with such precaution it is difficult to tell when the water delivered by the filter is in as pure a condition as the filter is capable of producing. By washing with the filtered water the filter is left in perfect condition at the close of the washing operation and its use can be immediately resumed and the product immediately utilized.

My invention furnishes a means of washing with the filtered water in that class of filters known as "pressure-filters," through which the water is forced under an artificial pressure—that is, one considerably greater than is due to the head of water within the filter itself.

To cleanse a large battery of pressure-filters, such as is required in rapidly filtering the entire water-supply of a city, it is necessary to maintain a reserve of the filtered water under pressure, such as is induced by pumping the water through the filters into a water-column or elevated reservoir, from which the filtered water can be drawn under pressure to cleanse the filters by a reverse current.

During the operation of filtering by my invention the pumps which supply the unfiltered water to the filters must obviously produce a pressure upon the inlet side of the filters which is sufficiently greater than that in the water-tower to overcome the resistance of the filter-bed, and thus force the water through the filtering material. In washing the filter the conditions are reversed by cutting off the inlets of the filters from the pump or supply of impure water and connecting them with the sewer, which transfers the balance of pressure to the outlets of the filters, (which are connected with the filtered water,) and thus induces the reverse current through the filters.

The essential feature of my invention is the provision of a reserve of filtered water under pressure, which may be used for washing the filters by a reverse current and which, if necessary, may be simultaneously used to supply the distributing-mains during the washing operation. It is obvious that two batteries of filters may be used, each of sufficient capacity to supply the distributing-mains with filtered water and such batteries be alternately washed and used for supplying the mains; but in such case the reserve of water under pressure would still be required for washing the filters and the filtering plant would have to be much greater in size than is required by the construction shown in the drawings. The connection of the pipe $i$ to the pipe $n$ by the cock $s$ is required only to supply the water-tower or the distributing-mains with unfiltered water in case of emergency, and the cocks $s$, $n$, $h'$, and $q$ are not required to practice my invention, which is practiced solely by opening the cock $r$ and closing the cock $p$ during the filtering operation and reversing the relation of the cocks during the washing operation.

It is to be understood that although the drawings show a water-column $f$ and reservoir $g$ only one of these elements is required to retain a water-reserve under pressure, though both may be used to insure a supply in the water-column for washing the filters if the water in the reservoir should be drawn off below the pipe $h$.

Instead of a sewer connection the washing-water may be discharged through a waste-pipe to any suitable outlet.

Having thus set forth the nature of the invention, what is claimed herein is—

1. A system of waterworks comprising distributing-mains, a receptacle for a water-reserve under pressure connected with such mains, a pump for supplying the impure water under pressure, and a battery of pressure-filters interposed between the pump and said receptacle, and suitable connections for washing the filters with the filtered water, substantially as herein set forth.

2. A system of waterworks comprising distributing-mains, a battery of pressure-filters, a water-column connected with the outlets of such filters and with the distributing-mains, a pump for forcing water through the said filters, to a suitable height in the water-column, a waste-pipe connected with the inlets of all the filters, and connections for cutting off the filter-inlets from the pump and opening them to the waste-pipe, whereby the pressure in the water-column automatically reverses the current through the filters and washes the same with the filtered water, while the water-column supplies the distributing-mains with the filtered water during the washing operation, substantially as herein set forth.

In testimony whereof I have hereunto set my hand in the presence of two subscribing witnesses.

WILLIAM A. FREISE.

Witnesses:
L. LEE,
THOMAS S. CRANE.